United States Patent
McVey et al.

(10) Patent No.: US 6,980,314 B1
(45) Date of Patent: Dec. 27, 2005

(54) METHOD AND DEVICE FOR IMPROVING UTILIZATION OF A BUS

(75) Inventors: John R McVey, Boise, ID (US); Dee Lee Chou, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/541,771

(22) Filed: Apr. 3, 2000

(51) Int. Cl.$^7$ .............................................. G06F 15/00
(52) U.S. Cl. .................... 358/1.16; 358/1.15; 358/1.17; 710/100; 710/119; 710/305
(58) Field of Search .............................. 358/1.16, 1.15, 358/1.9, 1.17; 710/119, 305, 100

(56) References Cited

U.S. PATENT DOCUMENTS 5,581,782 A * 12/1996 Sarangdhar et al. ........ 710/119
5,812,803 A * 9/1998 Pawlowski et al. ......... 710/305
6,032,214 A * 2/2000 Farmwald et al. .......... 710/305

FOREIGN PATENT DOCUMENTS

EP          0300228          10/1991

* cited by examiner

*Primary Examiner*—Twyler M. Lamb
(74) *Attorney, Agent, or Firm*—Gregg W. Wisdom

(57) ABSTRACT

An embodiment of a bus management device permits scheduling of transactions to allow concurrent execution of the transactions. Data bus usage is scheduled by setting shift register bits. Each position in the shift register corresponds to one clock cycle. When a current transaction is in a data phase, the value in the shift register is used to determine when to begin a control phase of the next transaction so that a desired number of idle clock cycles are present between data bus usage time periods for successive transactions.

32 Claims, 13 Drawing Sheets

| 0 | 0 | 0 | 0 | 0 | 0 | 0 | 0 | 0 | 1 | 0 | 1 | 1 | 1 | 1 |
|---|---|---|---|---|---|---|---|---|---|---|---|---|---|---|
| 14 | 13 | 12 | 11 | 10 | 9 | 8 | 7 | 6 | 5 | 4 | 3 | 2 | 1 | 0 |

FIG.3A

| 0 | 0 | 0 | 0 | 0 | 0 | 1 | 1 | 0 | 1 | 1 | 1 | 1 | 1 | 1 |
|---|---|---|---|---|---|---|---|---|---|---|---|---|---|---|
| 14 | 13 | 12 | 11 | 10 | 9 | 8 | 7 | 6 | 5 | 4 | 3 | 2 | 1 | 0 |

FIG.3B

| 0 | 0 | 0 | 0 | 0 | 0 | 0 | 0 | 0 | 0 | 1 | 1 | 1 | 0 | 1 |
|---|---|---|---|---|---|---|---|---|---|---|---|---|---|---|
| 14 | 13 | 12 | 11 | 10 | 9 | 8 | 7 | 6 | 5 | 4 | 3 | 2 | 1 | 0 |

FIG.3C

| 0 | 0 | 0 | 0 | 0 | 0 | 0 | 0 | 0 | 1 | 1 | 1 | 1 | 0 | 1 |
|---|---|---|---|---|---|---|---|---|---|---|---|---|---|---|
| 14 | 13 | 12 | 11 | 10 | 9 | 8 | 7 | 6 | 5 | 4 | 3 | 2 | 1 | 0 |

FIG.3D

|  | 14 | 13 | 12 | 11 | 10 | 9 | 8 | 7 | 6 | 5 | 4 | 3 | 2 | 1 | 0 |  |
|---|---|---|---|---|---|---|---|---|---|---|---|---|---|---|---|---|
| 300 | 0 | 0 | 0 | 0 | 0 | 0 | 0 | 0 | 0 | 0 | 0 | 0 | 0 | 0 | 0 | CLOCK 0 |
| 302 | 0 | 0 | 0 | 0 | 0 | 0 | 0 | 0 | 0 | 1 | 1 | 1 | 1 | 0 | 0 | CLOCK 1 |
| 304 | 0 | 0 | 0 | 0 | 0 | 0 | 0 | 0 | 0 | 0 | 1 | 1 | 1 | 1 | 0 | CLOCK 2 |
| 306 | 0 | 0 | 0 | 0 | 0 | 0 | 1 | 1 | 1 | 1 | 0 | 1 | 1 | 1 | 1 | CLOCK 3 |
| 308 | 0 | 0 | 0 | 0 | 0 | 0 | 0 | 1 | 1 | 1 | 1 | 0 | 1 | 1 | 1 | CLOCK 4 |
| 310 | 0 | 0 | 0 | 0 | 0 | 0 | 0 | 0 | 1 | 1 | 1 | 1 | 0 | 1 | 1 | CLOCK 5 |
| 312 | 0 | 0 | 0 | 0 | 0 | 0 | 0 | 0 | 0 | 1 | 1 | 1 | 1 | 0 | 1 | CLOCK 6 |
| 314 | 0 | 0 | 0 | 0 | 0 | 0 | 0 | 0 | 0 | 0 | 1 | 1 | 1 | 1 | 0 | CLOCK 7 |
| 316 | 0 | 0 | 0 | 0 | 0 | 0 | 0 | 0 | 0 | 0 | 0 | 1 | 1 | 1 | 1 | CLOCK 8 |
| 318 | 0 | 0 | 0 | 0 | 0 | 0 | 0 | 0 | 0 | 0 | 0 | 0 | 1 | 1 | 1 | CLOCK 9 |
| 320 | 0 | 0 | 0 | 0 | 0 | 0 | 0 | 0 | 0 | 0 | 0 | 0 | 0 | 1 | 1 | CLOCK 10 |
| 322 | 0 | 0 | 0 | 0 | 0 | 0 | 0 | 0 | 0 | 0 | 0 | 0 | 0 | 0 | 1 | CLOCK 11 |
| 324 | 0 | 0 | 0 | 0 | 0 | 0 | 0 | 0 | 0 | 0 | 0 | 0 | 0 | 0 | 0 | CLOCK 12 |
|  | 14 | 13 | 12 | 11 | 10 | 9 | 8 | 7 | 6 | 5 | 4 | 3 | 2 | 1 | 0 |  |

FIG.3F

```
//*****************************************************************************
// SYNCHRONOUS MEMORY DATA HANDLER BLOCK
//*****************************************************************************

// Tlength0 and Tlength1: Burst length - 1.
// Len0 and Len1: Based on Tlength with a value between 0 and 3.
// Trob0 and Trob1: Rest of burst. Indicates number of words until next column address
// Busy0 and Busy1: A bit stream that represents the number of burst words.
// Tdatardy: The shift register.
// Mask: A shift register to insert wait states between accesses.
// Sync0 and Sync1: Indicates the access is for synchronous memory.
// Tread0 and Tread1: Indicates the access is a read, otherwise it is a write.
// Csd0 and Csd1: The initial access latency.
// Busy0 and Busy1: A four bit vector of 1's.
// Mask0 and Mask1: A five bit vector of 1's.
// Next_tdatardy0 and Next_tdatardy1: Value to be synchronously loaded into Tdatardy.
// Next_mask0 and Next_mask1: Value to be synchronously loaded into Mask shift register
// Cmd_rdy0 and Cmd_rdy1: Tells master that it is okay to commit to the access.
// Next_rdy0 and Next_rdy1: Logic to force a dead clock between accesses.

// ***************
// Create length that decrements based on RWCmd.
// Note: Tcnt decrements on Tdatardy in the target, which is much too late.
// *************** always @(Tlength0)
        begin
          if (|Tlength0[4:2])          // Length > 2'b11
            Len0 = 2'b11;
          else
            Len0 = Tlength0[1:0];
        end // ***************
// Create length that decrements based on RWCmd.
// Note: Tcnt decrements on Tdatardy in the target, which is much too late.
// *************** always @(Tlength1)
        begin
          if (|Tlength1[4:2])          // Length > 2'b11
            Len1 = 2'b11;
          else
            Len1 = Tlength1[1:0];
        end
```

FIG.5A

```
// ***************
// Convert Trob into bit stream.
// *************** always @(Trob0 or Len0)
      begin
        case (Trob0)              // synopsys full_case parallel_case
          2'h0:         Busy0[3:0] = 4'b0001;
          2'h1:   case (Len0[1:0])    // synopsys full_case parallel_case
                    2'h0:   Busy0[3:0] = 4'b0001;
                    2'h1:   Busy0[3:0] = 4'b0011;
                    2'h2:   Busy0[3:0] = 4'b0011;
                    2'h3:   Busy0[3:0] = 4'b0011;
                  endcase
          2'h2    case (Len0[1:0])    // synopsys full_case parallel_case
                    2'h0:   Busy0[3:0] = 4'b0001;
                    2'h1:   Busy0[3:0] = 4'b0011;
                    2'h2:   Busy0[3:0] = 4'b0111;
                    2'h3:   Busy0[3:0] = 4'b0111;
                  endcase
          2'h3:   case (Len0[1:0])    // synopsys full_case parallel_case
                    2'h0:   Busy0[3:0] = 4'b0001;
                    2'h1:   Busy0[3:0] = 4'b0011;
                    2'h2:   Busy0[3:0] = 4'b0111;
                    2'h3:   Busy0[3:0] = 4'b1111;
                  endcase
        endcase
      end // ***************
// Convert Trob into bit stream.
// *************** always @(Trob1 or Len1)
      begin
        case (Trob1)              // synopsys full_case parallel_case
          2'h0:         Busy1[3:0] = 4'b0001;
          2'h1:   case (Len1[1:0])    // synopsys full_case parallel_case
                    2'h0:   Busy1[3:0] = 4'b0001;
                    2'h1:   Busy1[3:0] = 4'b0011;
                    2'h2:   Busy1[3:0] = 4'b0011;
                    2'h3:   Busy1[3:0] = 4'b0011;
                  endcase
          2'h2:   case (Len1[1:0])    // synopsys full_case parallel_case
                    2'h0:   Busy1[3:0] = 4'b0001;
                    2'h1:   Busy1[3:0] = 4'b0011;
                    2'h2:   Busy1[3:0] = 4'b0111;
                    2'h3:   Busy1[3:0] = 4'b0111;
                  endcase
          2'h3:   case (Len1[1:0])    // synopsys full_case parallel_case
                    2'h0:   Busy1[3:0] = 4'b0001;
                    2'h1:   Busy1[3:0] = 4'b0011;
                    2'h2:   Busy1[3:0] = 4'b0111;
                    2'h3:   Busy1[3:0] = 4'b1111;
                  endcase
        endcase
      end
```

FIG.5B

```
// ***************
// Shift right by 1.  Shift in zero for MSB.
// FIX: the high order bit should be shifted in as zero in the Next_tdatardy block.
// *************** always @(posedge Clk or negedge nRst)
    begin
      if (!nRst)
      begin
        Tdatardy <= 15'h0000;
        Mask     <= 15'h0000;
      end
      else if (RWCmd0 & !RWCmd1)
      begin
       Tdatardy[13:0] <= Next_tdatardy0;
        Tdatardy[14]   <= 0;

Mask[13:0]     <= Next_mask0;
       Mask[14]       <= 0;
      end
      else if (RWCmd1 & !RWCmd0)
      begin
       Tdatardy[13:0] <= Next_tdatardy1;
       Tdatardy[14]   <= 0;

Mask[13:0]     <= Next_mask1;
       Mask[14]       <= 0;
      end
      else      // shift
      begin
       Tdatardy[13:0] <= Tdatardy[14:1];
       Tdatardy[14]   <= 0;

Mask[13:0]    <= Mask[14:1];
        Mask[14]      <= 0;
      end
    end
```

FIG.5C

```verilog
// ***************
// Generate next bit stream by concatenating old bit stream with new bit stream.
// Bit stream includes a right shift of one bit.
// *************** always @(Tdatardy or Csd0 or Busy0 or Sync0 or Tread0 or Mask0)
    begin
      if (Sync0 && Tread0)          // Read
      begin
        casex (Csd0)                // synopsys parallel_case
        3'h1: begin
                Next_tdatardy0 = {6'h0,Busy0,Tdatardy[4:1]};
                Next_mask0     = {5'h0,Mask0,Tdatardy[4:1]};
              end
         3'h2: begin
                Next_tdatardy0 = {5'h0,Busy0,Tdatardy[5:1]};
                Next_mask0     = {4'h0,Mask0,Tdatardy[5:1]};
              end
         3'h3: begin
                Next_tdatardy0 = {4'h0,Busy0,Tdatardy[6:1]};
                Next_mask0     = {3'h0,Mask0,Tdatardy[6:1]};
              end
         3'h4: begin
                Next_tdatardy0 = {3'h0,Busy0,Tdatardy[7:1]};
                Next_mask0     = {2'h0,Mask0,Tdatardy[7:1]};
              end
         3'h5: begin
                Next_tdatardy0 = {2'h0,Busy0,Tdatardy[8:1]};
                Next_mask0     = {1'h0,Mask0,Tdatardy[8:1]};
              end
         3'h6: begin
                Next_tdatardy0 = {1'h0,Busy0,Tdatardy[9:1]};
                Next_mask0     = {Mask0,Tdatardy[9:1]};
              end
          default: begin
                Next_tdatardy0 = 14'bxx_xxxx_xxxx_xxxx;
                Next_mask0     = 14'bxx_xxxx_xxxx_xxxx;
              end
        endcase
       end
       else if (Sync0 && !Tread0)   // Write
        begin
         Next_tdatardy0 = {9'h00,Busy0,Tdatardy[1]};
         Next_mask0     = {8'h00,Mask0,Tdatardy[1]};
        end
       else                         // async
      begin
         Next_tdatardy0 = 14'h0000;
         Next_mask0     = 14'h0000;
       end
  end
```

FIG. 5D

```
// ****************
// Determine if new access can issue R/W command.
// ****************
      always @(Tdatardy or Mask or Csd1 or Sync1 or Tread1)
      begin
        if (!Sync1)
        begin
          Cmd_rdy1    = ~(|(Mask[14:0]));
          Next_rdy1   = ~(|(Mask[14:0]));
        end
        else if (Tread1)                              // Read
        begin
          case (Csd1)                                 // synopsys parallel_case
          3'h1: begin
                Cmd_rdy1  = ~(|(Tdatardy[14:5]));
                Next_rdy1 = ~(|(Mask[14:5]));
                end
          3'h2: begin
                Cmd_rdy1  = ~(|(Tdatardy[14:6]));
                Next_rdy1 = ~(|(Mask[14:6]));
                end
          3'h3: begin
                Cmd_rdy1  = ~(|(Tdatardy[14:7]));
                Next_rdy1 = ~(|(Mask[14:7]));
                end
          3'h4: begin
                Cmd_rdy1  = ~(|(Tdatardy[14:8]));
                Next_rdy1 = ~(|(Mask[14:8]));
                end
          3'h5: begin
                Cmd_rdy1  = ~(|(Tdatardy[14:9]));
                Next_rdy1 = ~(|(Mask[14:9]));
                end
          3'h6: begin
                Cmd_rdy1  = ~(|(Tdatardy[14:10]));
                Next_rdy1 = ~(|(Mask[14:10]));
                end
          default: begin
                Cmd_rdy1  = ~(|(Tdatardy[14:5]));
                Next_rdy1 = ~(|(Mask[14:5]));
                  end
          endcase
        end
        else                                          // Write
        begin
          Cmd_rdy1  = ~(|(Tdatardy[14:2]));
          Next_rdy1 = ~(|(Mask[14:2]));
        end
      end
```

FIG.5E

```
// ****************
// Generate next bit stream by concatenating old bit stream with new bit stream.
// Bit stream includes a right shift of one bit.
// **************** always @(Tdatardy or Csd1 or Busy1 or Sync1 or Tread1 or Mask1)
    begin
      if (Sync1 && Tread1)                     // Read
      begin
        casex (Csd1)                           // synopsys parallel_case
        3'h1: begin
                Next_tdatardy1 = {6'h0,Busy1,Tdatardy[4:1]};
                Next_mask1     = {5'h0,Mask1,Tdatardy[4:1]};
              end
        3'h2: begin
                Next_tdatardy1 = {5'h0,Busy1,Tdatardy[5:1]};
                Next_mask1     = {4'h0,Mask1,Tdatardy[5:1]};
              end
        3'h3: begin
                Next_tdatardy1 = {4'h0,Busy1,Tdatardy[6:1]};
                Next_mask1     = {3'h0,Mask1,Tdatardy[6:1]};
              end
        3'h4: begin
                Next_tdatardy1 = {3'h0,Busy1,Tdatardy[7:1]};
                Next_mask1     = {2'h0,Mask1,Tdatardy[7:1]};
              end
        3'h5: begin
                Next_tdatardy1 = {2'h0,Busy1,Tdatardy[8:1]};
                Next_mask1     = {1'h0,Mask1,Tdatardy[8:1]};
              end
        3'h6: begin
                Next_tdatardy1 = {1'h0,Busy1,Tdatardy[9:1]};
                Next_mask1     = {Mask1,Tdatardy[9:1]};
              end
        default: begin
                Next_tdatardy1 = 14'bxx_xxxx_xxxx_xxxx;
                Next_mask1     = 14'bxx_xxxx_xxxx_xxxx:
              end
        endcase
      end
      else if (Sync1 && !Tread1)                // Write
      begin
        Next_tdatardy1 = {9'h00,Busy1,Tdatardy[1]};
        Next_mask1     = {8'h00,Mask1,Tdatardy[1]};
      end
      else                                      // Async
      begin
        Next_tdatardy1 = 14'h0000;
        Next_mask1     = 14'h0000;
      end
    end
```

FIG. 5F

```
// ***************
// Determine if new access can issue R/W command.
// ***************
      always @ (Tdatardy or Mask or Csd0 or Sync0 or Tread0)
      begin
        if (!Sync0)
        begin
          Cmd_rdy0      = ~(|(Mask[14:0]));
          Next_rdy0     = ~(|(Mask[14:0]));
        end
        else if (Tread0)                          // Read
        begin
         case (Csd0)                              // synopsys parallel_case
          3'h1: begin
                    Cmd_rdy0  = ~(|(Tdatardy[14:5]));
                    Next_rdy0 = ~(|(Mask[14:5])):
                end
          3'h2: begin
                    Cmd_rdy0  = ~(|(Tdatardy[14:6]));
                    Next_rdy0 = ~(|(Mask[14:6])):
                end
          3'h3: begin
                    Cmd_rdy0  = ~(|(Tdatardy[14:7]));
                    Next_rdy0 = ~(|(Mask[14:7])):
                end
          3'h4: begin
                    Cmd_rdy0  = ~(|(Tdatardy[14:8]));
                    Next_rdy0 = ~(|(Mask[14:8])):
                end
          3'h5: begin
                    Cmd_rdy0  = ~(|(Tdatardy[14:9]));
                    Next_rdy0 = ~(|(Mask[14:9])):
                end
          3'h6: begin
                    Cmd_rdy0  = ~(|(Tdatardy[14:10]));
                    Next_rdy0 = ~(|(Mask[14:10])):
                end
          default: begin
                    Cmd_rdy0  = ~(|(Tdatardy[14:5]));
                    Next_rdy0 = ~(|(Mask[14:5])):
                   end
         endcase
        end
        else                                      // Write
        begin
          Cmd_rdy0  = ~(|(Tdatardy[14:2]));
          Next_rdy0 = ~(|(Mask[14:2])):
        end
      end
```

FIG.5G

METHOD AND DEVICE FOR IMPROVING UTILIZATION OF A BUS

FIELD OF THE INVENTION

This invention relates to systems and devices employing one or more buses to provide control signals, address information, or data. More particularly, this invention relates to a device to improve the utilization of a bus.

BACKGROUND OF THE INVENTION

In systems using memory devices, such as ROMs, DRAMs, SRAMs, or the like, a memory controller is used for controlling access to the memory devices according to requests from other devices, such as a processor or a direct memory access (DMA) controller. Typically, memory devices do not generate outputs used for handshaking operations in sending or receiving data. In systems using these types of memory devices, the handshaking operations in data transfers involving the memory devices are performed by the memory controller. Memory controllers frequently include internal hardware, such as counters or timers, that perform a timing function to ensure that control signals, address information, or data is delivered to or taken from the appropriate bus at the correct time. When different types of memory devices are used in the system, this can lead to complexity because of the different timing requirements of different memory devices. In addition, using memory devices having different timing requirements can result in reduced utilization of the bus. A need exists for a device and a method for using the device that will improve the utilization of the bus.

SUMMARY OF THE INVENTION

Accordingly, a method for performing a transaction on a bus has been developed. The method includes receiving a signal requesting the transaction and generating a first value using the signal. The method also includes storing the first value in a storage device, with the first value including a plurality of bits indicating a beginning of usage of the bus and an ending of the usage of the bus for the transaction in terms of clock cycles. In addition, the method includes executing the transaction according to the first value.

A system, includes a bus, a processor configured to receive first data from the bus, and a first memory device configured to send the first data to the bus. The system further includes a memory controller coupled to the processor and the memory device and configured to control transfer of the first data over the bus. The system also includes a bus management device arranged to receive a first value from the memory controller indicating a number of clock cycles with the first data on the bus. The bus management device includes a storage device to store a second value including a first plurality of bits for indicating a beginning of the first data on the bus and an ending of the first data on the bus in terms of the clock cycles.

An electrophotographic imaging device for forming images on media using imaging data includes a photoconductor and a photoconductor exposure system configured to generate a latent electrostatic image on the photoconductor using video data. In addition, the electrophotographic imaging device includes a video data generator configured to generate the video data using pixel data and a processor configured to generate the pixel data from the imaging data. The electrophotographic imaging device further includes a bus, a first memory device configured to provide first data to the bus, and a memory controller configured to control transfer of the first data between the first memory device and the processor. Additionally, the electrophotographic imaging device includes a bus management device arranged to receive a first value from the memory controller indicating a number of clock cycles with the first data on the bus. The bus management device includes a storage device to store a second value including a first plurality of bits for indicating a beginning of the first data on the bus and an ending of the first data on the bus in terms of the clock cycles.

DESCRIPTION OF THE DRAWINGS

A more thorough understanding of embodiments of the bus management device may be had from the consideration of the following detailed description taken in conjunction with the accompanying drawings in which:

FIGS. 3a through 3d provide examples of scheduling transactions on a bus using an embodiment of the bus management device.

FIGS. 3e and 3f show the relationship between a clock and values in a register in an embodiment of the bus management device on successive clock cycles.

FIGS. 5A–5G include hardware description language code for an embodiment of the bus management device.

DETAILED DESCRIPTION OF THE DRAWINGS

Figure 1:
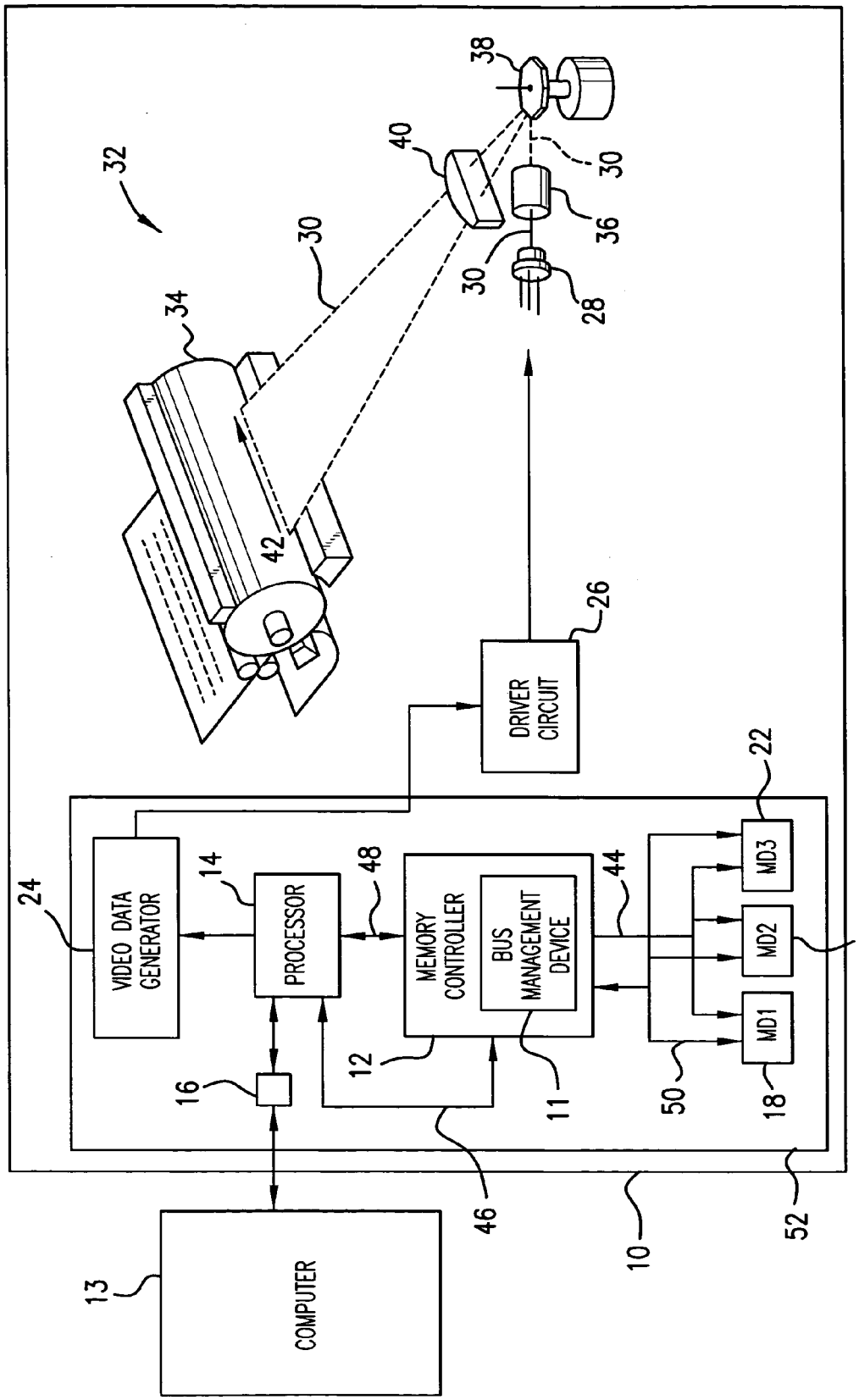
FIG. 1 shows a simplified block diagram of an electrophotographic imaging device, such as an electrophotographic printer, that includes an embodiment of the bus management device.

The bus management device is not limited to the embodiments disclosed in this specification. Although an embodiment of the bus management device will be disclosed in the context of operation in a memory controller, it should be recognized that embodiments of the bus management device may be included in other devices, such as a processor, or a bus interface unit. Furthermore, embodiments of the bus management device could be implemented as a stand alone device in an integrated circuit. Additionally, although an embodiment of the bus management device will be discussed in the context of improving the utilization of a bus, such as a data bus, it should be recognized that the techniques applied to the data bus context may be applied to improve utilization of an address bus or a command bus. In fact, any system, device, or apparatus using a bus for transferring digital signals could improve utilization of the bus using an embodiment of the bus management device. For example, an embodiment of the bus management device could be used within a computing device, such as a personal computer, to manage transactions over a data bus. In this application, the embodiment of the bus management device schedules transactions to reduce the number clock cycles for which the data bus is idle while reducing the likelihood of bus contention. In addition, the embodiment of the bus management device allows memory devices having different access times to be used without the need for the memory controller to include a substantial amount of additional hardware. For example, different types of RAM have different access time requirements. The embodiment of the bus management device permits the use of these different types of RAM without requiring a substantial amount of additional of hardware and without causing a substantial increase in the number of clock cycles during which the data bus is in an idle condition.

Memory devices, such as DRAMs, SRAMs, ROMs, and the like, typically do not generate control signals used for the handshaking of data transfers between the memory device and other devices coupled to a data bus. Consider, for example, a processor reading data from a memory device, such as a DRAM in a system having a typical memory controller to manage memory accesses. The processor generates address and control signals which are used to initiate the output of data from the memory device onto the data bus after a delay necessary for accessing the data in the memory device. When the processor is signaled that there is valid data on the data bus, the processor latches in the data on the data bus. The processor receives the signal that valid data is present from the memory controller. Because the memory device does not generate handshaking signals, the memory controller includes the capability, by for example using a counter or timer, to determine when valid data will be present on the data bus after a read is initiated by the processor. When the timer or counter in the memory controller indicates that valid data is present on the data bus, a signal is generated by the memory controller to prompt the processor to latch the data present on the data bus into the processor.

Different types of memory devices, such as SRAMs, DRAMs, and ROMs have different access times in reading data from the memory device, or as applicable, in writing data to the memory device. These access time differences occur with respect to data, address and control signals. Different types of memory devices may have different requirements with respect to the time for which data, address, or control signals must be valid on those inputs to meet setup time requirements. Or, different types of memory devices will have different performance characteristics with respect to the time taken to present valid data onto a data bus after receiving an address input. Therefore, transactions between a processing device, such as a CPU or a DMA, and a memory device will consume differing numbers of clock cycles dependent upon the specifications of the particular memory device. Transactions involving accesses to different types of memory devices are managed to account for the different times required for application of the data, address and control signals to the memory devices. These differing requirements between memory devices complicate the activities performed by the memory controller to ensure the proper transfer of data. Generally it is the memory controller that includes the capability to account for the different timing requirements of different memory devices to ensure that the control and address signals are applied at the correct times. One way in which this is can be accomplished by the memory controllers is to use counters or timers (included in the memory controller) to generate the necessary delays for accesses to the memory devices. The memory controller also includes the capability to signal the device requesting the access (for example, the processor or DMA unit) that valid data is present on the data bus after a delay dependent on the access time of the memory device.

When multiple devices, such as processors or DMA controllers, request accesses to the memory devices at substantially the same time, the memory controller arbitrates between the requests to determine the order of the accesses. After the arbitration decision is made, the accesses are made in the order determined by the arbitration. The time delay between the end of one access and the beginning of the next access can consume multiple clock cycles. Because no activity is taking place on the buses (control bus, address bus, or data bus) during the clock cycles between accesses, these clock cycles, with respect to improving utilization of the buses, are wasted. By reducing the number of clock cycles between accesses for which the buses are not involved in transactions, utilization of the bus can be improved.

Shown in FIG. 1 is a high level block diagram of an imaging device, such as electrophotographic printer 10, including an embodiment of a bus management device, bus management device 11, included in memory controller 12. Electrophotographic printer 10 receives data from computer 13 used to form an image. This data may be in several different formats. The data could be in the form of a display list or raster data. The display list print data includes the information necessary to construct the pages to be printed. Display list data may include raster data along with codes identifying the raster data as text or raster image print data, printer control language codes representing text characters, vector graphics language codes representing a vector graphics image, or some combination of each of these types of data. Processor 14, such as a micro-processor, or other general purpose processor, is arranged to receive the data, through an interface, such as parallel interface 16. Depending upon the type of data received, processor 14 may perform one or more of a number of image processing operations such as rasterization, compression, decompression, color space conversion, half toning or the like. Depending upon the capabilities of electrophotographic imaging device 10, processor 14 may include a general purpose processor or specialized data processing pipeline hardware, such as a data compressor, data decompressor, color space converter, or halftoning device in addition to a general purpose processor.

The operations performed by processor 14 may involve the use of memory devices, such as memory device 18, memory device 20, and memory device 22 for storing the data received from computer 13, storing the intermediate results of operations performed by processor 14, or storing the final results of operations performed by processor 14. Memory devices 18–22 may include memory technologies such as SRAMs (such as, synchburst SRAM) DRAMs (including one or more of EDO, FPM, and synchronous DRAM), ROMs (such as synchronous ROM, page mode ROM, burst ROM, or OTPs), EEPROMs, and flash memory.

Memory controller 12 manages the flow of data between processor 14 and memory devices 18–22. In this particular implementation, the data transferred between processor 14 and memory devices 18–22 passes through memory controller 12. Memory controller 12 loads the data received from memory devices 18–22 and sends the data to processor 14. Passing data from accesses to memory devices 18–22 through memory controller 12 permits processor 14 to engage in other activities during the time required for memory devices 18–22 to deliver data to processor data bus 46. It should be recognized that, alternatively, memory controller 12 could be implemented to manage the transfer of data between processor 14 and memory devices 18–22 so that data directly passes from memory devices 18–22 into processor 14.

Processor 14 is involved in the generation of the raster data supplied to video data generator 24. The raster data supplied to video data generator 24 includes data corresponding to each pixel of the image that is to be formed. Video data generator 24 generates a video data stream using the pixel data. Driver circuit 26 is arranged to receive the video data stream generated by video data generator 24. Using the video data stream, driver circuit 26 provides drive current through laser diode 28. In response to the drive current, laser diode 28 generates a pulsating beam 30, with the time period of the pulses of the beam corresponding to the time period of the pulses of the video data. An embodiment of a photoconductor exposure system, such as photoconductor exposure system 32, controls the movement of pulsating beam 30 from laser diode 28 across the surface of a photoconductor, such as photoconductor drum 34. Pulsating beam 30 passes through collimating lens 36, is reflected from rotating scanning mirror 38, and passes through flat focusing lens 40 before impinging upon photoconductor drum 34. Pulsating beam 30 exposes regions on the surface of photoconductor drum 34 as it moves in direction 42 across the surface of photoconductor drum 34.

Memory controller 12 is coupled to memory devices 18–22 through address and control bus 44. Processor data bus 46 is used to transfer data between processor 14 and memory controller 12. Processor 14 communicates with memory controller 12 through control and address bus 48. Memory controller 12 generates the necessary control and address signals to allow reading of the contents of any of memory devices 18–22 or to allow writing to those memory devices of memory devices 18–22 that include that capability. Memory data bus 50 transfers data between memory devices 18–22 and memory controller 12. The high speed at which processors and DMAs can operate relative to the access times of memory makes it possible to accomplish other activities during the time in which memory accesses are performed. These other activities could include beginning the next scheduled access of one of memory devices 18–22. The ability of the processor 14 (or DMA controller) to begin additional memory accesses before completion of the current access creates the need for bus management device 11. Bus management device 11 can schedule multiple future transactions over memory data bus 50 so that the transactions are performed in a way that reduces the clock cycles during which memory data bus 50 is idle. Without the scheduling of bus transactions performed by bus management device 11, a typical memory controller would complete the current memory transaction before beginning the next transaction. In this case, transactions are performed in a serial fashion instead of concurrently. Typically, there is a delay between the application of the address information and the delivery of valid data to memory data bus 50 by the memory device. When transactions are performed serially, the data bus is idle for a number of clock cycles equal to this delay.

However, bus management device 11 operates to schedule transactions involving memory devices 18–22 to reduce the number of clock cycles during which memory data bus 50 is idle by scheduling future transactions so at least a portion of the delay in an access occurs while memory data bus 50 is used for a previous transaction. A memory transaction involves executing a control phase and then waiting for the data phase to begin. During the control phase, the necessary address and control signals are applied to the memory device in preparation for the data phase. During the data phase, valid data is placed on memory data bus 50 either from the memory devices 18–22 in a read access or from memory controller 12 during a write access. The control phase and data phase are not tightly coupled with respect to the times at which they are performed. For example, in an access to a DRAM, the row address is provided first in the control phase. At a later time the column address is applied. The data is supplied to the data bus after a latency time period for the DRAM following application of the column address. The column address may be applied at any time after the row address. Bus management device 11 schedules transactions on memory data bus 50 so that while memory data bus 50 has valid data from a first memory access, the control phase for a second memory access has already been started. In this manner, valid data for the second memory access will be present one clock cycle after the last clock cycle during which data for the first memory access was valid, thereby reducing the number of clock cycles memory data bus 50 is idle.

Bus management device 11 uses a storage device in scheduling transactions to reduce the number of idle cycles. This storage device is used for storing a value representing planned future transactions on memory data bus. The bits of the value stored in the memory device represent the transactions on memory data bus 50 in terms of the cycles of the clock used to control the timing of activity on memory data bus 50. The number of bits in the value is equal to the number of clock cycles into the future for which transactions are scheduled. The highest order bit of the value represents the transactions on memory data bus 50 farthest into the future in terms of the number of clock cycles. The lowest order bit represents transactions on memory data bus 50 during the next clock cycle. Periodically, the value stored in the storage device is updated to reflect the passage of clock cycles. The updating of the value may be done on each clock cycle or after multiple clock cycles. The updating of the value in the storage device includes effectively shifting the highest order bit toward the lowest order bit. Furthermore, as additional transactions on memory data bus 50 are scheduled, bits of the value stored in the storage device are changed to reflect the future planned execution of these transactions. These changes to the bits of the value may be done by bus management device 11 as the requests for these transactions are made, or bus management device 11 may change the value after several requests for transactions have been collected. Therefore, at any instant, the value stored in the storage device reflects the transactions to be executed on memory data bus 50 from the next clock cycle until the number of clock cycles into the future equal to the number of bits in the value. Although many different types of storage devices may be used in bus management device 11, a shift register is particularly well suited for the storage device because of the ease with which the bits of the shift register may be changed to reflect the occurrence of clock cycles.

As previously mentioned, memory devices 18–22 may be of different classes such as SRAM, DRAM, ROM. Within each of these broad classes of memory devices there are a variety of individual types of memory devices which may have unique performance characteristics. During power up of electrophotographic imaging device 10, memory devices 18–22 are polled to determine the types of memory devices coupled to memory data bus 50. This information is accessed by memory controller 12. The information generated from the polling operation is used to generate a memory map. This memory map allows memory controller 12 to determine which of memory devices 18–22 are to be accessed when an address is provided by processor 14. The hardware that performs the polling operation is included within printed circuit assembly 52 external to memory controller 12. However, it should be recognized that memory controller 12 could be designed to include the capability to perform the polling operation.

Processor 14 utilizes memory controller 12 in performing transactions such as reads and writes over processor data bus 46 and memory data bus 50. The addresses of memory locations that processor 14 attempts to access are provided to memory controller 12 over control and address bus 48. Memory controller 12 decodes the address provided over control and address bus 48 to determine which of memory devices 18–22 contains the locations corresponding to the addresses provided by processor 14. In addition, from the addresses provided by processor 14, memory controller generates the signals on address and control bus 44 necessary for accessing location within memory devices 18–22 specified by the addresses received from processor 14. As previously mentioned, some types of memory devices, such as DRAM, are accessed by applying a row address on address and control bus 44 followed by a column address on address and control bus 44. Memory controller 12 performs the multiplexing on control and address bus 44 as required by the different memory device types to accomplish the access.

The different types of memory devices that may be included in memory devices 18–22 may have different read access times and, if any of memory devices 18–22 can be written to, different write access times. To allow the coordination of transfers over memory data bus 50 in a way that reduces the number of clock cycles during which memory data bus 50 is idle, the read and write access times of each of memory devices 18–22 are taken into account. Memory controller 12 has access to data specifying the read access times and the write access times in terms of the number of clock cycles on memory data bus 50. When processor 14 signals memory controller 12 indicating a request for a data transfer over processor data bus 46, memory controller 12 decodes the address provided by processor 14. From the memory map created by memory controller 12, the type of memory device that will be accessed is determined. Based upon the type of memory device that will be accessed, memory controller 12 operates with bus management device 11 to schedule the requested transaction. To accomplish this, memory controller 12 accesses the data specifying the number of clock cycles of usage for memory data bus 50 for the transactions specified by processor 14 using the memory device or devices corresponding to the address provided by processor 14. This information is provided to bus management device 11. Using this information, bus management device 11 changes the value stored in the storage device to reflect the scheduling of this transaction over memory data bus 50 so that the number of clock cycles allocated to the transaction matches the requirements of the access to the memory device and so that there is a single clock cycle between the last valid data clock for the previous transaction and the clock cycle on which the data becomes valid on the current transaction. The value in the storage device will be changed so that a number of bits of the value equal to the number of clock cycles during which valid data is present on memory data bus 50 will be set to an asserted state. These bits indicate that, in the corresponding clock cycles, a data phase of the transaction involving memory data bus 50 is in progress. The state indicating a transaction may be a "1" or a "0".

Memory controller 12 includes hardware that tracks the order in which the multiple requested transactions will be performed and accesses the information (such as the addresses, memory type, access time, etc.) necessary to execute the multiple scheduled transactions. This information is accessed based upon the request from processor 14 for the transaction. In addition, hardware in memory controller 12 provides information to bus management device 11 that it uses to schedule the multiple transactions. This information includes the number of clock cycles during which valid data will be present on memory data bus 50, the number of clock cycles to provide address information, and the latency period for the transaction. The time at which memory controller 12 begins each of the multiple transactions is determined by bus management device 11 based upon the scheduling of the multiple transactions. Bus management device 11 monitors the value stored in the storage device on each clock cycle. When the bits of the value indicate that the next transaction is to begin (taking into account the time between the beginning of the access and the presence of valid data on memory data bus 50 for the next transaction), bus management device 11 causes memory controller 12 to initiate this transaction.

If the state of a monitored bit of the value (the bit corresponding to the beginning of the access to one or more of memory devices 18–22) indicates that on the next clock cycle a transaction (either a read access or a write access) is to begin, bus management device 11 signals memory controller 12 to generate the necessary signals on control bus and address bus 44 to initiate the access. If the access is a read, when the lowest order bit of the value in the storage device indicates that memory data bus 50 has valid data in the current clock cycle, this information is used to load data from memory data bus 50 into memory controller 12. If the access is a write, memory controller 12 is prompted to place data (data that was previously received from processor 14 and stored in a queue in memory controller 12) onto memory data bus 50 so that valid data is present on memory data bus 50 during the clock cycles for which the bits of the value in the storage device indicate that valid data should be present on memory data bus 50 for that access. Then the memory controller 12 will generate the necessary signals on control bus and address bus 44 to complete the transaction. At the appropriate time before the end of the current transaction (as determined by the control phase for the next access), bus management device 11 will cause memory controller 12 to begin executing the control phase of the next scheduled transaction.

If, for a transaction involving a read or write access, a memory controller (that did not use timers or counters to adjust for access time differences between memory devices of different types) executed read or write accesses in a serial fashion, the memory controller would wait a period time at least equal to a read access time or write access time (as applicable) of the slowest of memory devices 18–22 before loading valid data from memory data bus 50 or placing data onto memory data bus 50. Because of this, memory data bus 50 would not be as efficiently utilized as it is by using bus management device 11 in memory controller 12. Memory data bus 50 would be idle between read accesses or write accesses for a length of time (depending upon whether the next transaction was a read access or a write access) equal to the maximum read access time or the maximum write access time of memory devices 18–22. However, bus management device 11 schedules the transactions on memory data bus 50 so that the next access to one of memory devices 18–22 will begin before the end of the current access by a number of clock cycles that accounts for the number of clock cycles of the latency period (either read or write), the number of clock cycles required to provide address information, and the specified number of clock cycles between transactions. Therefore, the number of clock cycles for which memory data bus 50 is idle between transactions will be reduced.

It should be recognized that an arbitrary number of future transactions could be scheduled using bus management device 11 by adjusting the size of the storage device so that it includes a number of bits equal to the number of clock cycles into the future for which transactions will be scheduled. In addition, the order of transactions requested by processor 14 could be changed to gain additional efficiencies in the use of memory data bus 50. For example, consider the case in which processor 14 has requested one transaction having a relatively long access time followed by two transactions having a relatively short transaction time (the sum of the time required to provide the address information, the latency time, and the time during which memory data bus 50 has valid data). In addition, the transaction having the relatively long access time is only a few clock cycles less than the combined number of clock cycles required to complete the first two transactions. In this case, it would be more efficient to begin one of the short transactions and while this is under way begin the control phase of the long transaction. Then, while the control phase of the long transaction is underway, the two short transactions could be completed. After completion of the two short transactions, the data phase of the long transaction could be begin. Performing the transactions in this order would consumer fewer total cycles than performing the transactions in the order requested by processor 14.

Scheduling the usage of memory data bus 50 using bus management device 11 permits the scheduling of transactions on memory data bus 50 in a consistent manner that reduces the likelihood of bus contention. Bus contention on memory data bus 50 results when multiple devices attempt to control the state of memory data bus 50 at substantially the same time. Bus management device 11 allows scheduling of the transactions on memory data bus 50 to control the number of clock cycles between the times during which valid data is present on memory data bus 50. Depending upon the characteristics of the devices connected to memory data bus 50, the desired rate at which transactions are to be performed, and the desired bus contention safety margin, bus management device 11 may be configured so that there are an arbitrary number of clock cycles between the valid data times of successive transactions. For example, for maximum performance, bus management device 11 could be configured for zero clock cycles between the valid data times. To improve the safety margin, bus management device could be configured to have many clock cycles between valid data times. Although the embodiments of the bus management device described in this specification schedule a single idle clock cycle between transactions, it should be recognized that an arbitrary number of clock cycles could be placed between transactions.

By using bus management device 11 to schedule all transactions over memory data bus 50, memory controller 12 is much less likely to generate control signals, that cause multiple devices to attempt to drive memory data bus 50 at substantially the same time. In memory controllers using multiple counters or timers to control activity on a data bus, it is possible that for certain types of transactions, several counters or timers may generate control signal that overlap in time, thereby causing multiple devices to attempt to control the state on the data bus. However, because bus management device 11 schedules all transactions on memory data bus 50 by setting the sequential bits of the value stored in the storage device, transactions on memory data bus 50 are much less likely to overlap.

Yet another advantage provided by memory controller 12 is the reduction in the amount of hardware needed to access multiple types of memory devices. By using the bits of the value stored in the storage device to schedule transactions on memory data bus 50, the need for multiple timers and counters to generate control signals at the correct times for the memory devices is reduced.

Figure 2:
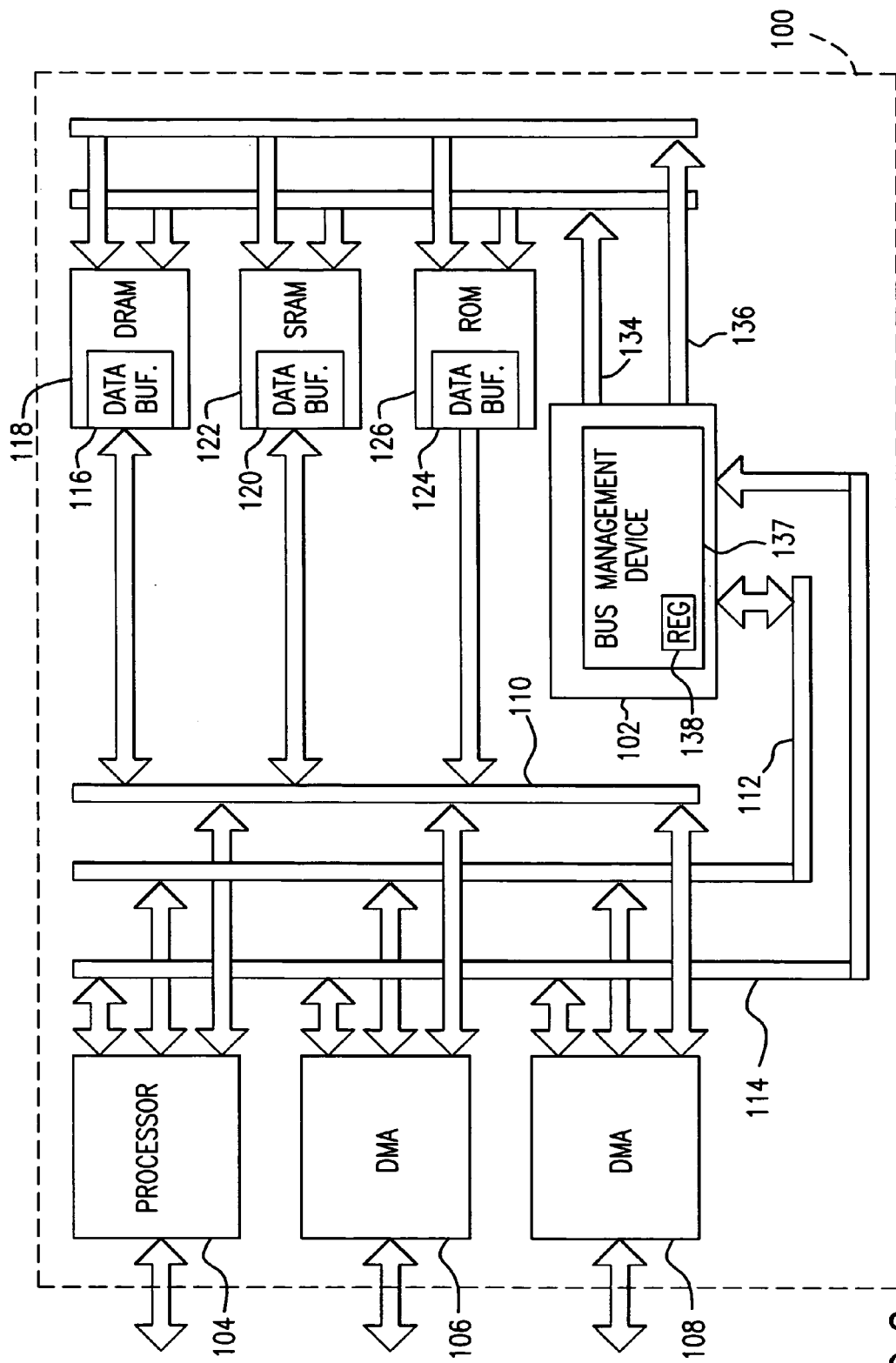
FIG. 2 shows a high level block diagram of a system including an embodiment of the bus management device.

Shown in FIG. 2 is a simplified block diagram of a system 100 including an embodiment of a memory controller, memory controller 102. System 100 includes a processor 104, a first DMA unit 106, and a second DMA unit 108. Processor 104, first DMA unit 106, and second DMA unit 108 are coupled to data bus 110, address bus 112, and control bus 114. Data bus 110 is coupled to internal data buffer 116 in DRAM 118, internal data buffer 120 in SRAM 122, and internal data buffer 124 in ROM 126. Control of the movement of data between data bus 110 and DRAM 118, SRAM 122, and ROM 126 through, respectively, internal data buffer 116, internal data buffer 120, and internal data buffer 124 is done by the corresponding memory device as a result of memory controller 102 signals on control bus 114. It should be recognized that the memory devices included in system 100 may be either synchronous memory devices, asynchronous memory devices, or a combination of synchronous and asynchronous memory devices.

Memory controller 102 is coupled to address bus 112 and control bus 114. Memory controller 102 receives address information for accesses through address bus 112. In addition, memory controller 102 sends and receives control information through control bus 114. Memory controller 102 also generates address information for accessing any one or more of DRAM 118, SRAM 122, and ROM 126 over address bus 134. Furthermore, memory controller 102 generates the necessary control signals and provides these control signals over control bus 136 for accessing any one or more of DRAM 118, SRAM 122, and ROM 126 by one or more of processor 104, first DMA unit 106, and second DMA unit 108.

Memory controller 102 includes a configuration to manage data transfers between any one or more of DRAM 118, SRAM 122, and ROM 126 and any one or more of processor 104, first DMA unit 106, and second DMA unit 108 in a way that improves utilization of data bus 110. The management of data transfers using system 100 will be explained with reference to FIGS. 3A–3F. Included in memory controller 102 is an embodiment of a bus management device, such as bus management device 137.

Bus management device 137 includes a storage device, such as register 138. The bits forming the value stored in register 138 indicate the clock cycles during which data bus 110 has valid data. A value of "1" in a bit position indicates that data bus 110 has valid data during the corresponding clock cycle. A value of "0" indicates that data bus 110 is not in use during the corresponding clock cycle. Each bit of the register 138 represents activity on the data bus 110 in a single clock cycle. Although register 138 includes 15 bits to schedule the usage of data bus 110 15 clock cycles into the future, it should be recognized that a greater or fewer number of bits could be used in register 138. The number of bits desired in register 138 will depend upon such factors as the maximum transfer length that will occur over data bus 110, the longest latency time period of the memory devices coupled to data bus 110, and the maximum number of transactions that can be concurrently scheduled. Although memory controller 102 and bus management device 137 can be designed to improve utilization of data bus 110 in a system using synchronous or asynchronous memory devices, it should be recognized that memory controller 102 and bus management device 137 are particularly well suited for improving bus utilization in a system using synchronous memory devices.

Memory controller 102 tracks the order in which multiple requested transactions will be performed. In addition, in preparation for each of the scheduled transactions, memory controller 102 accesses information such as, the address of the device to be accessed in the transaction, the type of memory to be accessed, the access time of the memory, etc. When memory controller 102 receives the signal from bus management device 137 to begin the transaction, this information is used to begin the control phase of the access.

To schedule transactions on data bus 110, bus management device 137 uses information provided by memory controller 102. This information includes the number of clock cycles for which valid data will be present on data bus 110 during the transaction, the number of clock cycles required to provide the address information, and the latency period for the access to the selected device. With this information, bus management device 137 sets a number of bits in register 138 to a logic 1 equal to the number of clock cycles that data bus 110 will be used in the transaction. The location of the bits set to a logic 1 in register 138 will be one clock cycle after the end of the usage of data bus 110 for the previous transaction (although bus management device 137 could be designed to schedule any number of idle clock cycles between successive transactions).

Using the information regarding the latency period and time to provide address information for the scheduled transaction, bus management device 137 will signal memory controller 102 to begin the control phase of the upcoming transaction so that data bus 110 will receive valid data from the transaction 1 clock cycle after the end of the valid data period for the previous transaction. Bus management device 137 accomplishes this by checking the bit position in register 138 corresponding to the number clock cycles required from the start of the control phase until valid data is provided. When the 0 corresponding to the clock cycle between usage time periods of data bus 110 on successive transactions is shifted into this position, bus management device 137 signals memory controller 102 that the control phase of the corresponding transaction should begin. Because memory controller 102 tracks the order in which the transactions are to be performed, when this signal is received from bus management device 137 to begin the control phase of the next transaction, memory controller 102 supplies the correct address and control signals for that transaction to address bus 134 and control bus 136.

FIG. 3A shows the value in register 138 (with each bit corresponding to one storage element in register 138) for a transaction in which data bus 110 is to be used for 4 clock cycles (indicated by bits 0–3 of register 138 set to a logic 1) to accomplish an access (either a read or a write) beginning with the rising edge of the next clock cycle. This value was stored in register 138 by bus management device 137 after a request is made for a transaction by processor 104, first DMA unit 106, or second DMA unit 108 was made to memory controller 102. At the instant represented by FIG. 3A, the clock cycles of this transaction corresponding to the latency period and time to provide the address information for the access have already past so that the lowest order bit of register 138 corresponds to the first clock cycle of the access in which valid data is present on data bus 110.

After the transaction corresponding to the 4 lowest order bits shown in FIG. 3A is completed, there is one clock cycle of delay before beginning a read access of one word (indicated by bit 5 of register 138 set to a logic 1) using data bus 110 for one clock cycle. Bus management device 137 loads register 138 with a logic 1 at bit 5 to schedule the usage of data bus 110 during the upcoming read access. Bus management device 137 updates register 138 after memory controller 102 receives a request for a transaction over data bus 110 from any of processor 104, first DMA unit 106, or second DMA unit 108 to schedule the requested transaction. However, bus management device 137 could be configured to update register 138 to reflect the scheduled transactions on each clock cycle or after several transactions have been requested. On the rising edge of each clock cycle, bus management device 137 shifts the lowest order bit out of register 138 and shifts 0's in from the left to reflect the passage of a clock cycle. Bits of register 138 are set to logic 1 by bus management device 137 to schedule future usage of data bus 110.

Figure 3E:
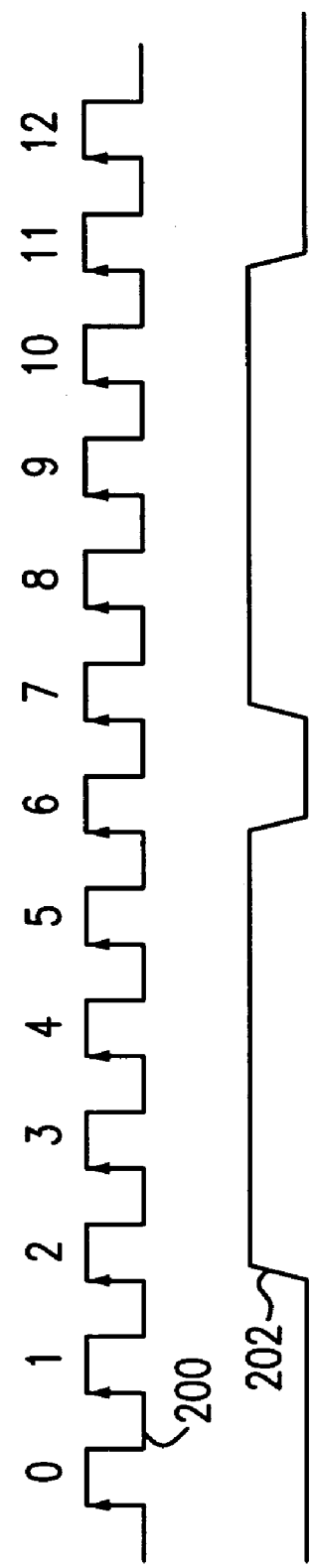

FIG. 3B shows the scheduling of a read access of 2 words beginning at bit 7 and using two clock cycles. The read access follows a transaction on data bus 110 using 6 clock cycles. FIG. 3C shows a write access of 3 words beginning at bit 2 and using 3 clock cycles. FIG. 3D shows a write access of 4 words beginning at bit 2 and using 4 clock cycles. Shown in FIG. 3E is clock signal 200. Signal 202 is the value of bit 0 corresponding to clock signal 200 for values in register 138 as shown in FIG. 3F over 13 clock cycles as the bits 0–14 are sequentially shifted right toward bit 0 on each successive clock cycle. The value of register 138 is shown on each of 13 clock cycles.

Shown in FIG. 3F is a representation of successive values stored in register 138 corresponding to cycles of the clock shown in FIG. 3E. With the passage of each cycle of the clock, the bits in register 138 are shifted to the right. The scheduling of transactions using bus management device 137 will be described with reference to FIG. 3F. The number of the clock cycle to which the value of register 138 corresponds is shown to the right of each of the lines in FIG. 3F.

In line 300, corresponding to clock cycle 0, all of the bits of register 138 are at 0 indicating that no transactions are scheduled over data bus 110. In line 302, corresponding to clock cycle 1, bits 2–5 have been set to logic 1, indicating that a first transaction, such as a write access, is scheduled on data bus 110. Usage of data bus 110 for this transaction is scheduled to begin 2 clock cycles into the future from the present clock cycle. The 2 clock cycles occurring before usage of data bus 110 begins are used to complete the control phase of this transaction. With one word transferred during each clock cycle, line 302 corresponds to the writing of 4 words.

In line 304, corresponding to clock cycle 2, no additional transaction has been scheduled on data bus 110 and the contents of register 138 are shifted to the right by one bit position. During the clock period corresponding to line 304, the control phase of the first scheduled transaction is underway. In line 306, corresponding to clock cycle 3, a second transaction, such as a read access, is scheduled on data bus 110 by setting bits 5–8 to a logic 1, beginning with clock cycle 5. One clock cycle of latency on data bus 110 is allowed to prevent bus contention between memory devices coupled to data bus 110. With one word transferred during each clock cycle, the read access scheduled during line 306 corresponds to the reading of 4 words. Also, during line 306 the data phase of the first transaction begins.

The contents of register 138 are used to signal memory controller 102 to begin the control phase of the transaction corresponding to bits 5–8 on line 306. Consider the case in which the read access to the device scheduled on line 306 includes a control phase having 3 clock cycles. That is, 3 clock cycles are required from the start of the control phase until valid data is supplied to data bus 110 by the accessed memory device. The length of the control phase includes the latency period of the memory devices and the time required to provide the address information. When this transaction was scheduled, bus management device 137 received information from memory controller 102 specifying that this transaction has a control phase requiring 3 clock cycles.

So that the data phase for this transaction can begin 1 clock cycle after the end of the data phase for the previous transaction (thereby reducing idle clock cycles for data bus 110), bus management device 137 monitors the state of bit 3 of register 138. When bit 3 of register 138 changes to the logic 0 state on line 308 and the next highest order bit is at a logic 1 (indicating that usage of data bus 110 was actually scheduled), then bus management device 137 signals memory controller 102 to begin the control phase of the second transaction on the next clock cycle. The data phase of the first transaction is completed after clock 6 on line 312. After clock 7 on line 314 the control phase of the second transaction is completed. From the beginning of clock period 8 through the end of clock period 11 (lines 316 through 322) the data phase of the second transaction is completed. At line 324, transactions of data bus 110 have been completed and all bits of register 138 are at a logic 0.

Processor 104, first DMA unit 106, and second DMA unit 108 may request accesses to one or more of DRAM 118, SRAM 122, or ROM 126 at substantially the same time. In this situation, memory controller 102 would arbitrate between the requests and schedule transactions over data bus 110 according to some pre-determined priority level for completing these transactions.

Bus management device 137 improves the utilization of data bus 110 by scheduling transactions on data bus 110 to account for access time differences between DRAM 118, SRAM 122, and ROM 126. Bus management device 137 signals memory controller 102 to initiate the control phase of the access the correct number of clock cycles before the scheduled beginning of the data phase so that there this only a single clock cycle during which data bus 110 is not in use between the data phases of successive transactions. By scheduling the transactions in this manner, bus management device 137 is able to account for latency time differences between DRAM 118, SRAM 122, and ROM 126. Although the operation of system 100 has been described in the context of memory devices including DRAM 118, SRAM 122, and ROM 126 (where bus management device 137 is particularly well suited for improving utilization of data bus 110 when used with synchronous memory devices) it should be recognized that system 100 could include other types of memory devices that could transfer data over data bus 110.

The benefits provided by bus management device 137 were discussed in the context of improving utilization of data bus 110. It should be recognized that other types of buses, such as address buses and control buses could use the principles of bus management device 137 to reduce the number of idle clock cycles on those buses. For example, a storage device could be used to store a value having bits that schedule usage of a control bus during a control phase of an access, or that schedule usage of an address bus during the control phase. As with the scheduling of the usage of data bus 110, the address and control bus could be scheduled to reduce the number of idle clock cycles between successive usages of the control bus or the address bus.

Consider the case in which a storage device could be used to store a value having bits that specify the usage of an address bus. Some memory devices, such as DRAMs, are accessed by applying a row address followed by a column address. The DRAM latches the row address and outputs data during a read after application of the column address or inputs data during a write after application of the column address.

An embodiment of the bus management device could be used to control the usage of an address bus as well as the data bus. The bus management device would schedule usage of the data bus to reduce the number of idle cycles between transactions on the data bus. In addition, the bus management device would schedule usage of the address bus so that multiple memory transactions could be interleaved by scheduling the performance of the control phases of multiple transactions well ahead of the corresponding data phases.

For example, two future memory accesses could be scheduled on the address bus so that a row address for a first access would be followed by a row address for a second address, followed by a column address for the first access, and finally followed by a column address for the second access. The bits of the value in the storage device would be set to schedule the usage of the address bus to order the application of the row and column addresses in this fashion. In addition, the bits of the value would be set to time the application of the row and column addresses so that the data bus is utilized to reduce the number of idle clock cycles between transactions.

The performance characteristics of memory devices now in use make interleaving of transactions over the address bus beneficial. For example, synchronous DRAM can provide 4 words of data for each column address provided instead of requiring a row address and column address for each word accessed. As a result, in systems that use memory devices that behave in this fashion, there are more clock cycles available on the address bus to interleave transactions. As an alternative, the bus management device could be configured to use otherwise idle cycles on the address bus to send debug codes to the devices coupled to the address bus. Or, the bus management device could be configured to use otherwise idle cycles on a control bus. For example, otherwise idle cycles on the control bus could be used to initiate a refresh operation in DRAM.

Figure 4:
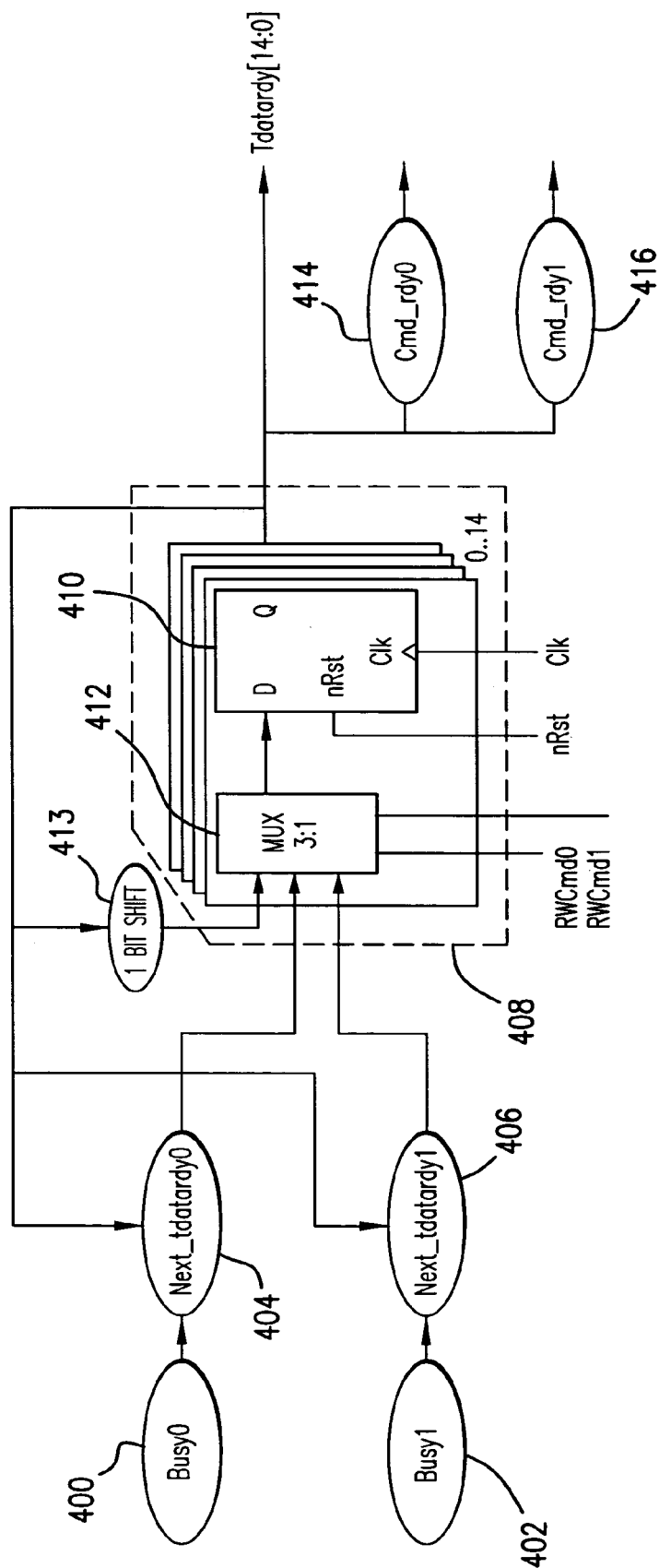
FIG. 4 shows a conceptual block diagram of an embodiment of the bus management device.

Shown in FIG. 4 is a conceptual block diagram of an embodiment of bus management device 11 that could be used in an embodiment of memory controller 12. Included in FIGS. 5A–5G is hardware description language code for an embodiment of bus management device 11 corresponding to the block diagram in FIG. 4. Busy0 400 corresponds to a input signal received from memory controller 12 into bus management device 11. Busy0 400 includes a 4 bit vector with the number of bits in the signal at a logic 1 corresponding to the number of words to be transferred in a requested read or write access. Busy1 402 also corresponds to an input signal received from memory controller 12 that specifies the number of words to be transferred in a requested read or write access.

The embodiment of memory controller 12 used with bus management device 11 includes two logic blocks that can initiate memory transactions. Although bus management device 11 is used in the embodiment of memory controller 12 having a parallel architecture, it should be recognized that bus management device 11 could also be used with a memory controller architecture that operated in a pipeline fashion. With the parallel architecture used in this embodiment of memory controller 12, requests for scheduling transactions are alternated between Busy0 400 and Busy1 402. For example, while the logic block corresponding to Busy0 400 is performing a transaction, the logic block corresponding to Busy1 402 could begin another transaction. When the transaction corresponding to Busy0 400 has been completed, another transaction could be started with this logic block while the transaction involving the logic block corresponding to Busy1 402 is underway. In this manner, transactions are concurrently performed using the two logic blocks in memory controller 12.

Memory controller 12 performs a transaction involving an access of a number of words greater than the burst length of the memory device by partitioning it into smaller transactions having a maximum word length equal to the burst length of the memory device. For example, for a transaction involving a 16 word access to a memory device configured to have a burst length of 4, the transaction would be partitioned by memory controller 12 so that Busy0 400 (or Busy1 402) would receive 4 successive groups of 4 bits each set to a logic 1. Alternatively, with a memory device configured to have a burst length of 8, memory controller 12 and bus management device 11 could be designed to partition the transaction so that Busy0 400 would receive 2 successive groups of 8 bits each set to a logic 1. The embodiment of bus management device 11 disclosed in FIG. 4 is designed to partition transactions into 4 word groups because it is common for memory devices to have a burst length of 4 words.

For each 4 bit vector received (through either Busy0 400 or Busy1 402), a transaction is scheduled on memory data bus 50. Next_tdatardy0 404 and Next_tdatardy1 406 each represent a 15 bit vector. The two 15 bit vectors can be used to schedule usage of memory data bus 50. Each of these 15 bit vectors are generated by combining the values of Busy0 400 and Busy1 402 with the values currently stored in the register within bus management device 11. Busy0 400 and Busy1 402 are combined with the current register values so that the scheduled usage of memory data bus 50 corresponding to either Busy0 400 or Busy1 402 is placed at the correct location within the register with an idle clock cycle separating the scheduled transaction from the previous transaction. Generation of each of the 15 bit vectors also includes a right shift of one bit to account for the passage of a clock.

Block 408 represents the 15 storage elements in the register and the associated multiplexer with each of the storage elements. Flip flop 410 and multiplexer 412 are representative of these multiplexers and storage elements. RWCmd0 and RWCmd1 are signals used by each of the multiplexers to select from the provided inputs. RWCmd0 and RWCmd1 are generated by the two logic blocks in memory controller 12 on each clock cycle to select the correct multiplexer input for the transaction taking into account that the request for scheduling usage of memory data bus 50 is performed alternately by the two logic blocks. Each of the storage elements includes a reset input used to initialize the value in the register to 0.

The multiplexer inputs each include the corresponding bit of the Next_tdatardy0 404 vector, the Next_tdatardy1 406 vector, and a 1 bit shift right command 413. If the values of RWCmd0 and RWCmd1 indicate that there was no request for scheduling usage of memory data bus 50 for that clock cycle, then a shift right by one bit will be executed by the storage elements in the register. If the values of RWCmd0 or RWCmd1 select either Next_tdatardy0 404 or Next_tdatardy1 406, then the corresponding value is loaded into the storage elements of the register, thereby scheduling usage of memory data bus 50. The outputs of the 15 storage elements forms the Tdatardy value. This value represents the scheduled usage of the memory data bus 50 fifteen clock cycles into the future. As shown by the feedback to Next_tdatardy0 404 and Next_tdatardy1 406 from the output of the register, the Tdatardy value is used by the embodiment of bus management device 11 for scheduling future transactions.

Cmd_rdy0 414 and Cmd_rdy1 416 are single bit signals generated by this embodiment of bus management device 11 to signal the logic blocks in the memory controller 12 to begin the control phase of the transaction. The Tdatardy value is used by the embodiment of bus management device 11 in generating Cmd_rdy0 414 and Cmd_rdy1 416. The bits of the Tdatardy value indicate the transactions scheduled in the future. The embodiment of bus management device 11 finds the first logic 0 bit in the Tdatardy value (corresponding to an idle clock cycle on memory data bus 50) after the currently scheduled transaction on memory data bus 50. This logic 0 bit and all of the higher order bits in the register after this are combined in a bitwise OR operation.

If the result of the bitwise OR operation is a logic 0, then one of Cmd_rdy0 414 or Cmd_rdy1 416 will be set to a logic 1 to signal the corresponding logic block in memory controller 12 to begin the transaction. Which of Cmd_rdy0 414 or Cmd_rdy1 416 is set to a logic 1 is determined by whether the transaction corresponding to the bits combined in the bitwise OR operation was scheduled by Busy0 400 or Busy1 402. If the transaction was scheduled with the 4 bit vector of Busy0 400, then Cmd_rdy0 414 will be set to a logic 1 so the logic block that generated the request to schedule the transaction will be signaled to begin the control phase of that transaction. If the transaction was scheduled with the 4 bit vector of Busy1 402, then Cmd_rdy1 416 will be set to a logic 1 so the logic block that generated the request to schedule the transaction will be signaled to begin the control phase of that transaction. By generating Cmd_rdy0 414 and Cmd_rdy1 416 in this manner, the control phase for the scheduled transaction is started when the Tdatardy value is generated.

As previously mentioned, there is a delay between the beginning of the control phase and the time at which valid data is presented to memory data bus 50. In this embodiment of bus management device 11 and memory controller 12, three clock cycles of latency are contributed by the logic. The logic included in bus management device 11 requires three clock cycles of overhead that are included in the delay when transactions are scheduled. The 3 clock cycles of overhead are added to the latency period of the accessed memory device when the transaction is scheduled. It should be recognized that other embodiments of bus management device 11 may have a different number of overhead clock cycles that will need to be taken into account.

Although several embodiments of the bus management device have been illustrated, and their forms described, it is readily apparent to those of ordinary skill in the art that various modifications may be made to these embodiments without departing from the scope of the appended claims.

What is claimed is:

1. A method for performing a transaction on a bus, comprising:
   receiving a signal requesting the transaction;
   generating a first value using the signal;
   storing the first value in a storage device, with the first value including a plurality of bits and with those of the plurality of bits in a first state corresponding to clock cycles during which the usage of the bus occurs for the transaction; and
   executing the transaction according to the first value.

2. The method as recited in claim 1, wherein:
   each of the storage elements stores one of the plurality of bits.

3. The method as recited in claim 2, wherein:
receiving the signal includes receiving a second value indicating a number of the clock cycles during which the usage of the bus occurs for the transaction;
generating the first value includes generating the plurality of bits using the second value with positions within the first value of those of the plurality of bits in the first state indicating the clock cycles during which the usage of the bus occurs for the transaction; and
each of the positions within the first value corresponds to one of the storage elements.

4. The method as recited in claim 3, further comprising:
changing the first value in the storage device after storing the first value and after an occurrence of at least one of the clock cycles by shifting ones of the plurality of bits between the storage elements.

5. The method as recited in claim 4, wherein:
executing the transaction includes monitoring a first one of the positions to determine a beginning of the transaction.

6. The method as recited in claim 5, wherein:
those of the plurality of bits in a second state indicate the clock cycles during which the bus exists in an idle condition; and
generating the first value includes generating the plurality of bits in the second state so that the bus exists in the idle condition for at least one of the clock cycles between the usage of the bus for the transaction and the usage of the bus for a previous transaction.

7. The method as recited in claim 6, wherein:
the bus includes a data bus;
the transaction includes an access to a memory device including a control phase and a data phase;
executing the transaction includes beginning the control phase when the first one of the positions enters the second state; and
executing the transaction includes beginning the data phase when a second one of the positions enters the first state.

8. The method as recited in claim 6, wherein:
the bus includes an address bus;
the transaction includes an access to a memory device including a control phase;
executing the transaction includes beginning the control phase when the
the first one of the positions enters the first state.

9. A system, comprising:
a bus;
a processor configured to receive first data from the bus;
a first memory device configured to send the first data to the bus;
a memory controller coupled to the processor and the memory device and configured to control transfer of the first data over the bus; and
a bus management device arranged to receive a first value from the memory controller indicating a number of clock cycles with the first data on the bus and including a storage device to store a second value including a first plurality of bits, with positions within the second value of those of the first plurality of bits in a first state corresponding to clock cycles during which the first data exists on the bus.

10. The system as recited in claim 9, wherein:
those of the first plurality of bits in a second state indicate the clock cycles during which the bus exists in an idle condition; and
the bus management device includes a configuration to detect a change in one of the positions within the second value from the first state to the second state and to signal the memory controller to begin a first access to the first memory device a first time period before the clock cycles corresponding to those of the first plurality of bits in the first state begin.

11. The system as recited in claim 10, further comprising:
a second memory device configured to send second data to the bus, with the processor configured to receive the second data from the bus and with the bus management device arranged to receive a third value from the memory controller indicating a number of the clock cycles with the second data on the bus and to store a fourth value in the storage elements including a second plurality of bits for indicating a beginning of the second data on the bus and an ending of the second data on the bus in terms of the clock cycles.

12. The system as recited in claim 11, wherein:
positions within the fourth value of those of the second plurality of bits in the first state indicate the clock cycles during which the second data exists on the bus; and
the bus management device includes a configuration to change the fourth value by shifting ones of the second plurality of bits between the storage elements after an occurrence of at least one of the clock cycles.

13. The system as recited in claim 12, wherein:
those of the second plurality of bits in the second state indicate the clock cycles during which the bus exists in an idle condition; and
the bus management device includes a configuration to detect a change in one of the positions within the fourth value from the first state to the second state and to signal the memory controller to begin a second access to the second memory device a second time period before the clock cycles corresponding to those of the second plurality of bits in the first state begin.

14. An electrophotographic imaging device for forming images on media using imaging data, comprising:
a photoconductor;
a photoconductor exposure system configured to generate a latent electrostatic image on the photoconductor using video data;
a video data generator configured to generate the video data using pixel data;
a processor configured to generate the pixel data from the imaging data;
a bus;
a first memory device configured to provide first data to the bus;
a memory controller configured to control transfer of the first data between the first memory device and the processor; and
a bus management device arranged to receive a first value from the memory controller indicating a number of clock cycles with the first data on the bus and including a storage device to store a second value including a first plurality of bits for indicating a beginning of the first data on the bus and an ending of the first data on the bus in terms of the clock cycles.

15. The electrophotographic imaging device as recited in claim 14, wherein:
the storage device includes a register with positions within the register of those of the first plurality of bits in a first state indicating the clock cycles during which the first data exists on the bus; and the bus management device includes a configuration to change the second value by shifting ones of the first plurality of bits in the register after an occurrence of one of the clock cycles.

16. The electrophotographic imaging device as recited in claim 15, wherein:
the bus management device includes a configuration to signal the memory controller to begin a first control phase of a first access to the first memory device after storing the second value in the register and a configuration to generate the second value from the first value so that substantially contemporaneous with completion of the first control phase the clock cycles corresponding to those of the first plurality of bits in the first state begin.

17. The electrophotographic imaging device as recited in claim 16, further comprising:
a second memory device configured to send second data to the bus, with the memory controller configured to control transfer of the second data between the second memory device and the processor and with the bus management device arranged to receive a third value from the memory controller indicating a number of clock cycles with the second data on the bus and configured to store a fourth value including a second plurality of bits for indicating a beginning of the second data on the bus and an ending of the second data on the bus in terms of the clock cycles.

18. The electrophotographic imaging device as recited in claim 17, wherein:
the bus management device includes a configuration to change the fourth value by shifting ones of the first plurality of bits in the register after an occurrence of one of the clock cycles; and
the bus management device includes a configuration to signal the memory controller to begin a second control phase of a second access to the second memory device after storing the fourth value in the register and a configuration to generate the fourth value from the third value so that substantially contemporaneous with completion of the second control phase the clock cycles corresponding to those of the second plurality of bits in the first state begin; and
a number of the clock cycles forming the first control phase differs from a number of clock cycles forming the second control phase.

19. The electrophotographic imaging device as recited in claim 18, wherein:
the bus management device includes a configuration to generate and to store the fourth value in the register so that one of the clock cycles occurs between those of the first plurality of bits in the first state and those of the second plurality of bits in the first state.

20. A method, comprising:
scheduling a first transaction including usage of a bus by setting a first plurality of bits to a level, with each of the first plurality of bits set to the level indicating the usage of the bus during a corresponding one of a first plurality clock cycles to occur; and
scheduling a second transaction including usage of the bus by setting a second plurality of bits to the level, with each of the second plurality of bits set to the level indicating the usage of the bus during a corresponding one of a second plurality of clock cycles to occur after the first plurality of clock cycles.

21. The method as recited in claim 20, wherein:
the second plurality of clock cycles occurs at least one clock cycle after the first plurality of clock cycles.

22. The method as recited in claim 20, further comprising:
storing the first plurality of bits in a storage device; and
storing the second plurality of bits in the storage device.

23. The method as recited in claim 22, wherein:
the storage device includes a plurality of storage elements, with the storing the first plurality of bits and the storing the second plurality of bits including storing ones of the first plurality of bits and ones of the second plurality of bits in individual of the plurality of storage elements.

24. The method as recited in claim 23, further comprising:
with the storage device including a shift register, shifting the first plurality of bits and the second plurality of bits in the shift register corresponding to the occurrence of one of a clock cycle in the first plurality of clock cycles.

25. The method as recited in claim 24, wherein:
a first lowest order bit of the first plurality of bits corresponds to a beginning of a first transaction on the bus; and
a second lowest order bit of the second plurality of bits corresponds to a beginning of a second transaction on the bus.

26. The method as recited in claim 20, wherein:
a first number of the first plurality of bits corresponds to a first length of time of the usage of the bus for a first transaction in terms of clock cycles in the first plurality of clock cycles; and
a second number of the second plurality of bits corresponds to a second length of time of the usage of the bus for a second transaction in terms of clock cycles in the second plurality of clock cycles.

27. The method as recited in claim 20, wherein:
the first transaction includes accessing a first memory device;
the second transaction includes accessing a second memory device;
the first plurality of clock cycles includes a first number of the clock cycles corresponding to the first memory device having a first access time; and
the second plurality of clock cycles includes a second number of the clock cycles corresponding to the second memory device having a second access time.

28. The method as recited in claim 27, wherein:
scheduling the first transaction includes determining the first access time; and
scheduling the second transaction includes determining the second access time.

29. The method as recited in claim 20, wherein:
the bus includes a data bus;
the first transaction includes accessing a first memory device; and
the second transaction includes accessing a second memory device with application of address information to an address bus occurring during the usage of the data bus during the first transaction.

30. An apparatus, comprising:
means for determining a value including a plurality of bits, with those of the plurality of bits at a first level indicating usage of a bus during a first set of corresponding clock cycles and with those of the plurality of bits at a second level indicating no usage of the bus during a second set of corresponding clock cycles; and
a storage device to store the plurality of bits.

31. The apparatus as recited in claim 30, wherein:

the usage of the bus during the first set of the corresponding clock cycles corresponds to accessing a memory device; and the means for determining a value includes a configuration to determine a number of clock cycles included in the first set for accessing the memory device.

32. The apparatus as recited in claim 30, wherein:

the means for determining a value includes a configuration to change the plurality of bits in the storage device according to occurrence of ones of the first set of corresponding clock cycles and ones of the second set of corresponding cycles.

* * * * *